United States Patent
Pita-Gil et al.

(10) Patent No.: US 12,105,183 B2
(45) Date of Patent: Oct. 1, 2024

(54) METHOD FOR DETERMINING A MOVEMENT VECTOR OF A MOTOR VEHICLE, METHOD FOR DETERMINING A SPEED OF THE VEHICLE AND ASSOCIATED VEHICLE

(71) Applicant: RENAULT s.a.s., Boulogne-Billancourt (FR)

(72) Inventors: Guillermo Pita-Gil, Versailles (FR); Romain Saussard, Massy (FR); Salim Zair, Massy (FR)

(73) Assignee: AMPERE s.a.s., Boulogne-Billancourt (FR)

( * ) Notice: Subject to any disclaimer, the term of this patent is extended or adjusted under 35 U.S.C. 154(b) by 565 days.

(21) Appl. No.: 17/288,725

(22) PCT Filed: Oct. 29, 2019

(86) PCT No.: PCT/EP2019/079534
§ 371 (c)(1),
(2) Date: Apr. 26, 2021

(87) PCT Pub. No.: WO2020/089231
PCT Pub. Date: May 7, 2020

(65) Prior Publication Data
US 2021/0396864 A1   Dec. 23, 2021

(30) Foreign Application Priority Data
Oct. 31, 2018 (FR) ...................................... 1860106

(51) Int. Cl.
*G01S 13/58* (2006.01)
*G01S 13/60* (2006.01)
(Continued)

(52) U.S. Cl.
CPC ............ *G01S 13/60* (2013.01); *G01S 13/588* (2013.01); *G01S 13/589* (2013.01);
(Continued)

(58) Field of Classification Search
CPC .... G01S 13/726; G01S 13/589; G01S 13/588; G01S 13/931; G01S 13/60; G01S 13/87;
(Continued)

(56) References Cited

U.S. PATENT DOCUMENTS

| | | | |
|---|---|---|---|
| 2003/0172728 A1* | 9/2003 | Gustafsson | ........... B60C 23/061 73/146 |
| 2018/0024228 A1* | 1/2018 | Schiffmann | ............. G01S 13/86 342/174 |

(Continued)

OTHER PUBLICATIONS

International Search Report issued Jan. 24, 2020 in PCT/EP2019/079534, 2 pages.
(Continued)

*Primary Examiner* — Anne Marie Antonucci
*Assistant Examiner* — Jared C Bean
(74) *Attorney, Agent, or Firm* — Oblon, McClelland, Maier & Neustadt, L.L.P.

(57) ABSTRACT

A method for determining a movement vector of a motor vehicle includes: determining, via a radar system of the vehicle, at two successive instants, positions, relative to the vehicle, of elements of an environment of the vehicle that are static relative to the environment, associating the positions determined at these two successive instants with each other in such a way as to form different pairs of positions each grouping together the preceding position and the subsequent position of a given element of the environment, and determining the movement vector of the vehicle by linear regression, based on the pairs of positions thus formed.

10 Claims, 2 Drawing Sheets

Figure 1:
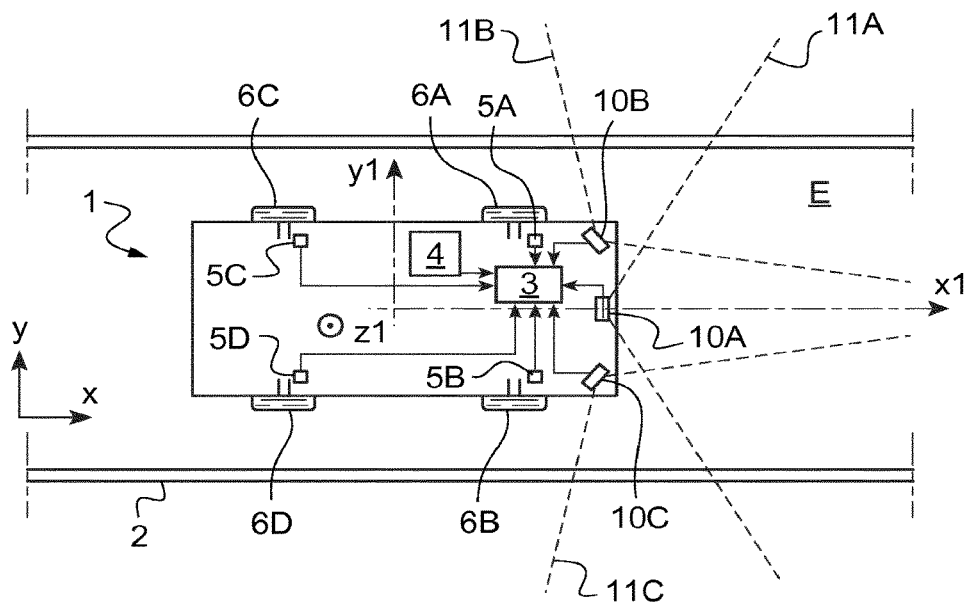

(51) Int. Cl.
*G01S 13/72* (2006.01)
*G01S 13/931* (2020.01)

(52) U.S. Cl.
CPC .......... *G01S 13/726* (2013.01); *G01S 13/931* (2013.01); *G01S 2013/93271* (2020.01)

(58) Field of Classification Search
CPC .......... G01S 13/44; G01S 2013/93271; G01C 21/20
See application file for complete search history.

(56) References Cited

U.S. PATENT DOCUMENTS

2018/0024569 A1* 1/2018 Branson ................ G01S 13/867
 701/23
2018/0245924 A1* 8/2018 Ishigami .............. G01C 21/165

OTHER PUBLICATIONS

M.W.M. Gamini Dissanayake, et al., "A Solution to the Simultaneous Localization and Map Building (SLAM) Problem", IEEE Transactions on Robotics and Automation, XP55575116, vol. 17 No. 3, Jun. 2001, pp. 229-241.
Dominik Kellner, et al., "Instantaneous Ego-Motion Estimation using Doppler Radar", Proceedings of the 16$^{TH}$ International IEEE Annual Conference on Intelligent Transportation Systems (ITSC 2013), XP55604073, Oct. 2013, pp. 869-874.

* cited by examiner

METHOD FOR DETERMINING A MOVEMENT VECTOR OF A MOTOR VEHICLE, METHOD FOR DETERMINING A SPEED OF THE VEHICLE AND ASSOCIATED VEHICLE

TECHNICAL FIELD OF THE INVENTION

The present invention relates to the characterization of the movement of a motor vehicle by way of sensors fitted to the vehicle.

It relates more particularly to a method in which a radar system fitted to the vehicle detects elements present in the surroundings of the vehicle, and determines their positions with respect to the vehicle.

It also relates to a motor vehicle in which such a method is implemented.

TECHNOLOGICAL BACKGROUND

An increasing number of motor vehicles are nowadays equipped with driving assistance systems, such as obstacle detection systems, distance control systems, or even systems for automatically steering the vehicle in order to guide it to an unoccupied parking space.

The operation of such driving assistance systems requires accurate knowledge about the position of the vehicle with respect to its surroundings, and therefore monitoring of the movements of this vehicle.

One method for determining a position of a motor vehicle, based on radar measurements, is described in the following article: "Instantaneous ego-motion estimation using doppler radar", Dominik Kellner et al., in *Intelligent Transportation system-(ITSC)*, 2013, 16th International IEEE Conference on. IEEE, 2013, pp. 869-874. In this method, a radar system detects elements in a surroundings of a vehicle and delivers data representative of positions and speeds of the detected elements with respect to the vehicle. Processing these data, making use of the dependence of the speeds of the detected elements as a function of their positions, then makes it possible to determine the speed of movement of the vehicle, and then to deduce therefrom the position of this vehicle with respect to its surroundings.

However, the field of application of this method is limited since it is able to be implemented only with a radar system that supplies not only the positions but also the speeds of the detected elements.

SUBJECT OF THE INVENTION

In order to rectify the abovementioned drawback from the prior art, the present invention proposes a method for determining a displacement vector of a motor vehicle, comprising a step a) of a radar system fitted to the vehicle determining positions, with respect to the vehicle, at a given time, of elements in a surroundings of the vehicle that are static with respect to a traffic lane in which the vehicle is moving, wherein, with step a) having been executed at a previous time in order to determine the previous positions of said elements with respect to the vehicle, step a) is executed again at a following time in order to determine the following positions of said elements with respect to the vehicle, the method furthermore comprising the following steps:
b) associating said previous positions with said following positions in order to form various pairs of positions each grouping together the previous position and the following position of the same element in the surroundings of the vehicle, and
c) determining, by linear regression, the respective features of an overall translation and of an overall rotation that make it possible, for the pairs of positions formed in step b), to match said previous positions with said following positions, and determining the displacement vector of the vehicle on the basis of the features of said overall translation and rotation.

Many commercially available motor vehicle radar systems are capable of determining, from among the elements in the surroundings of the vehicle that they detect, those that are static with respect to a traffic lane in which the vehicle is moving. These systems then deliver data representative of the positions of these static elements with respect to the vehicle at a given time. On the other hand, few of these systems deliver information in relation to the speed of the static elements thus detected. Radar systems that deliver accurate information with regard to the speed of such static elements are also generally expensive.

The method according to the invention then makes it possible to determine the displacement vector of the vehicle, even if the radar system under consideration does not supply the speed of the static elements that it detects in the surroundings of the vehicle.

Moreover, the fact that the displacement vector is determined in two stages, with preconditioning of the acquired data in association step b), as it were, allows robust determination of this vector, even if the number of elements detected by the radar system is limited and even if some of the elements, detected in the previous execution of step a), are not detected again in the new execution of this step.

The results thus obtained prove in particular to be more robust than those obtained under comparable conditions through ICP (from the acronym for "Iterative Closest Point") processing, in which a displacement vector of the vehicle would be determined, step by step, by searching for the transformation that, on average, makes it possible to move each position determined in previous step a) to that one of the positions, determined in following step a), that is the closest thereto.

One explanation for the lack of robustness of the "ICP" method in the present context is precisely the fact that the number of positions determined each time by the radar system is relatively low in practice, of the order of 50 at most, and that several of the elements detected at the previous time may no longer be detected at the following time.

Other non-limiting and advantageous features of the method for determining the displacement vector of the vehicle, taken individually or in any technically possible combination, are as follows:

step b) comprises the following steps:
b1) for various feasible pairs of positions each grouping together one of the following positions and one of the previous positions, determining an individual cost, associated with the feasible pair of positions under consideration, on the basis of the previous position and of the following position of this feasible pair of positions,
b2) from among various sets of feasible pairs of positions, identifying the set for which the value of an overall cost function is smallest, this overall cost function being determined on the basis of the individual costs associated respectively with the various pairs of positions of the set under consideration, the pairs of positions ultimately formed in step b) being the pairs of positions of the set thus identified in step b2);

step b1) comprises the following operations for at least one of the feasible pairs of positions:
shifting the previous position, on the basis of an estimate of the speed of movement of the vehicle, and of the duration between said previous and following times, in order to obtain an extrapolated position,
determining a deviation between the following position and said extrapolated position, and
determining the individual cost associated with this pair of positions, such that it is greater when said deviation is greater;

in step b1), for at least some of the feasible pairs of positions:
prior to calculating the individual cost associated with the feasible pair of positions under consideration, it is determined whether it is possible, or on the contrary unlikely, that this pair groups together two successive positions of the same element in the surroundings of the vehicle, and
when it has been determined that it is unlikely that this pair groups together two successive positions of the same element in the surroundings of the vehicle, said individual cost is assigned a predetermined threshold value;

in step b1), it is determined that it is unlikely that the feasible pair of positions under consideration groups together two successive positions of the same element in the surroundings of the vehicle when one of the following conditions is met:
said deviation is greater than a maximum feasible deviation,
a direction of movement of the vehicle, deduced from the feasible pair of positions under consideration, is opposite a previously determined direction of movement of the vehicle,
a lateral deviation from a longitudinal axis of movement of the vehicle, deduced from the feasible pair of positions under consideration, is greater than a maximum feasible lateral deviation;

step c) comprises the following steps:
c1) randomly selecting at least three pairs of positions from among the pairs of positions formed in step b),
c2) determining a first overall translation and a first overall rotation, by linear regression, from the pairs of positions selected in step c1),
c3) for each pair of positions, formed in step b) and that was not selected in step c1):
transforming the following position into a transformed position by applying the first translation and the first overall rotation determined in step c2) to the following position, and
determining a residual on the basis of a distance between said transformed position and the previous position of this pair,
c4) selecting a subset of pairs of positions comprising:
the pairs of positions selected in step c1), and
the pairs of positions, formed in step b), that were not selected in step c1), and for which said residual is less than a given limit, and
determining a second overall translation and a second overall rotation, by linear regression, on the basis of the previous positions and the following positions of the pairs of this subset, and
c5) evaluating the accuracy with which the second translation and the second rotation transform the following positions of the pairs of positions of this subset into the previous positions of these pairs,
the set of steps c1) to c5) being executed several times in succession,
the features of the overall translation and of the overall rotation ultimately determined in step c) being the features of the second translation and of the second rotation that make it possible to transform said following positions into said previous positions with the greatest accuracy.

The invention also proposes a method for determining a speed of movement of a motor vehicle, wherein a displacement vector of the vehicle is determined in accordance with the method for determining the displacement vector of the vehicle described above, the method for determining the speed of the vehicle furthermore comprising the following steps:
d) determining a first estimate of the speed of the vehicle from the displacement vector of the vehicle determined in step c),
e) determining a second estimate of the speed of the vehicle on the basis of a rotational speed of a wheel of the vehicle acquired by a rotational speed sensor, and
f) determining the speed of the vehicle on the basis of the first estimate of this speed and of the second estimate of this speed, by way of a Kalman filter configured so as to execute the following steps:
f1) determining a new estimate of a state vector of the vehicle, comprising components representative in particular of the speed and of an acceleration of the vehicle,
f2) determining a corrected estimate of the state vector of the vehicle, by calibrating the estimate of the state vector determined in step f1) on the basis of the first and second estimates of the speed of the vehicle determined in steps d) and e),
steps f1) and f2) being executed several times in succession and, when step f1) is executed again, said new estimate of the state vector of the vehicle is determined on the basis of the corrected estimate determined in the previous execution of step f2).

Other non-limiting and advantageous features of the method for determining the speed of the vehicle, taken individually or in any technically possible combination, are as follows:
the second estimate of the speed of movement of the vehicle is furthermore determined on the basis of a nominal radius of said wheel, the value of which is pre-recorded in the vehicle;
one of the components of the state vector of the vehicle estimated by the Kalman filter is a scale factor, representative of a deviation between said nominal radius and an effective radius of the wheels of the vehicle;
in step f2), the estimate of the speed of the vehicle that was determined in step f1) is compared with the second estimate of the speed of the vehicle, taking this scale factor into account;
in step f2), the estimate of the scale factor that was determined in previous step f1) is calibrated on the basis of the ratio between:
the first estimate of the speed of the vehicle, determined in step d) from the measurements from the radar system, and
the estimate of the speed of the vehicle determined in previous step f1).

The invention also proposes a motor vehicle comprising:
a radar system, configured so as to execute a step a) of determining positions, with respect to the vehicle, at a given time, of elements in the surroundings of the vehicle that are static with respect to a traffic lane in which the vehicle is moving, the radar system being configured, after having executed step a) at a previous time in order to determine the previous positions of said elements with respect to the vehicle, so as to execute step a) again at a following time in order to determine the following positions of these elements with respect to the vehicle, and
an electronic processing unit programmed to execute the following steps:
b) associating said previous positions with said following positions in order to form various pairs of positions each grouping together the previous position and the following position of the same element in the surroundings of the vehicle,
c) determining, by linear regression, the features of an overall translation and an overall rotation that make it possible, for the pairs of positions formed in step b), to transform said previous positions into positions practically coinciding with said following positions, or to transform said following positions into positions practically coinciding with said previous positions, and determining a displacement vector of the vehicle on the basis of the features of this translation and of this overall rotation.

The optional features presented above in terms of a method may also be applied to the vehicle that has just been described.

DETAILED DESCRIPTION OF ONE EXEMPLARY EMBODIMENT

The description that follows with reference to the appended drawings, which are given by way of non-limiting example, will make it easy to understand what the invention comprises and how it may be implemented.

Figure 2:
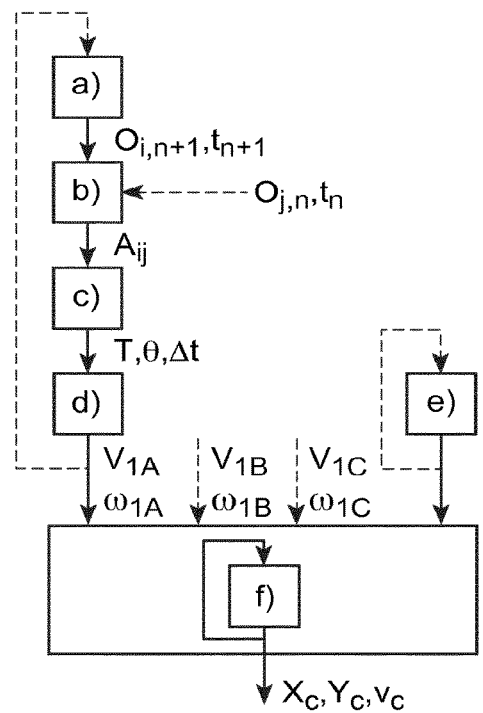
Figure 3:
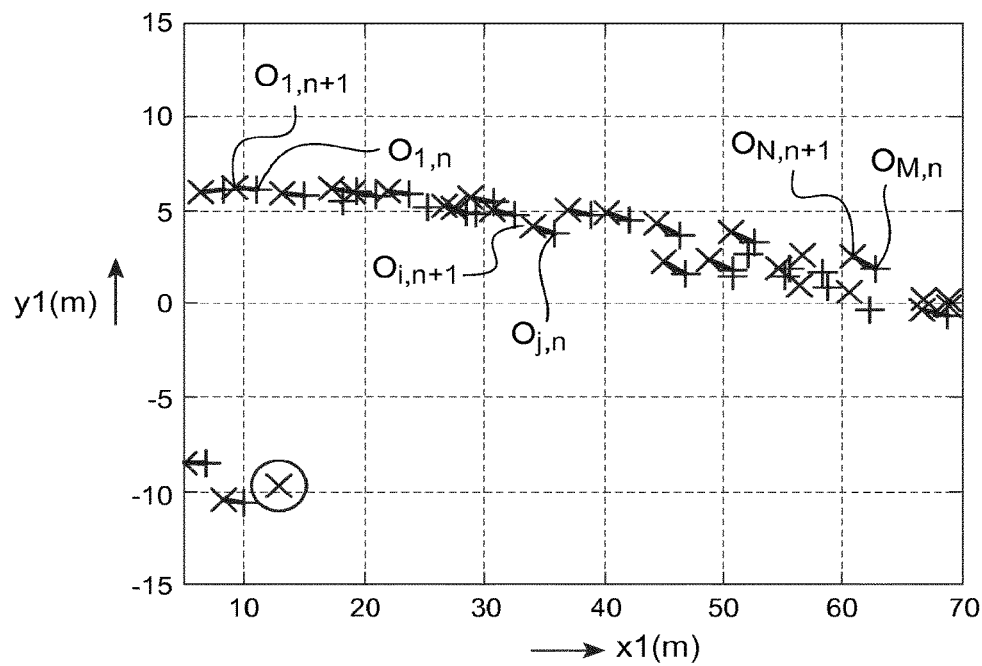
Figure 4:
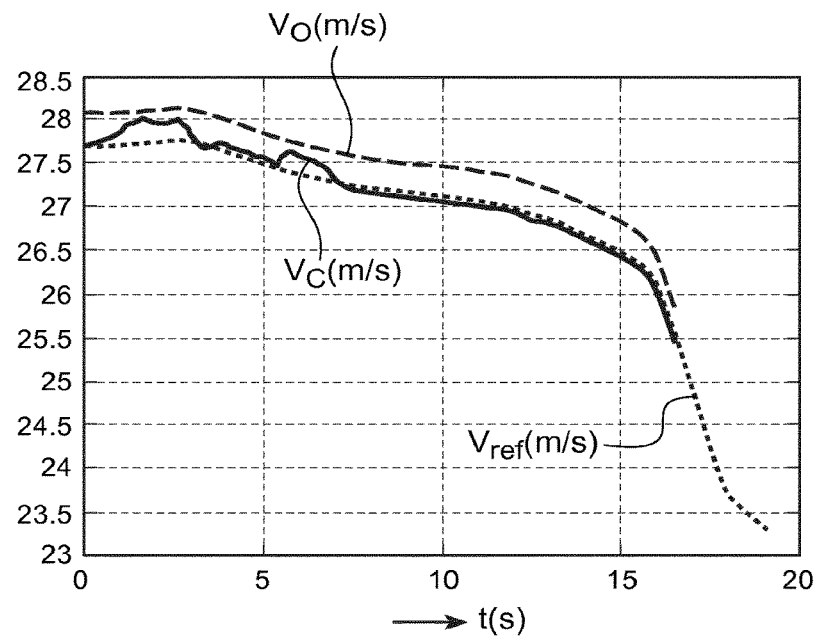

In the appended drawings:

FIG. 1 schematically shows a motor vehicle, seen from above,

FIG. 2 schematically shows the main steps of a method for determining a speed and a position of the vehicle from FIG. 1, implemented in this vehicle, FIG. 3 schematically shows two successive positions of several elements in a surroundings of the vehicle from FIG. 1, determined by a radar system of this vehicle during the method from FIG. 2, and FIG. 4 schematically shows the evolution over time of a speed of the vehicle determined using the method from FIG. 2, for one example of a journey, and the evolution of a reference speed of this vehicle, determined by a reference sensor, during this journey.

FIG. 1 schematically shows a motor vehicle equipped with at least one radar system 10A, 10B, 10C that makes it possible, through appropriate data processing, to determine a displacement vector of the vehicle, and to deduce therefrom a speed and a position of the vehicle 1 with respect to its surroundings E.

The various equipment of the vehicle 1 used to do this will be described first of all. The method implemented in order to determine the displacement vector of the vehicle, as well as its speed and its position, will be described second of all. Results obtained using this method will be presented last of all.

Motor Vehicle

As shown in FIG. 1, the vehicle 1 comprises an electronic processing unit 3, connected to various sensors including:
an inertial measurement unit 4,
four rotational speed sensors 5A, 5B, 5C, 5D each associated with one of the wheels 6A, 6B, 6C, 6D of the vehicle,
a steering angle sensor 7, and
three radar systems 10A, 10B and 10C.

Each of these radar systems 10A, 10B, 10C may for example be embodied by way of a model ARS430 radar from the manufacturer Continental Automotive, the detection field of which extends up to 250 meters ahead of the radar, with an aperture angle of approximately 150 degrees.

These three radar systems 10A, 10B and 10C are arranged at the front of the vehicle 1.

The first radar system 10A is oriented such that its detection field 11A extends facing the vehicle 1, centered on a longitudinal axis x1 of the vehicle.

The second radar system 10B is oriented such that its detection field 11B extends ahead of the vehicle 1, but offset, for example by 45 degrees, to the left of the longitudinal axis x1.

With regard to the third radar system 10C, this is oriented such that its detection field 11C also extends ahead of the vehicle 1, but offset, for example by 45 degrees, to the right of the longitudinal axis x1.

Furthermore, each of these three radar systems 10A, 10B, 10C is configured so as, in an acquisition step a), to:
use radar echo to detect elements in the surroundings E of the vehicle, such as trees, posts, portions of parapets or crash barriers, or even other vehicles, these being present at a time $t_n$ in the detection field 11A, 11B, 11C of the radar system under consideration, and to
determine the positions of the detected elements, with respect to the vehicle 1.

These positions are the positions that are occupied, at the same time $t_n$, by the various detected elements. The radar system 10A, 10B, 10C therefore records, as it were, an instantaneous radar image representative of the content of its detection field 11A, 11B, 11C at the time $t_n$ under consideration.

Each of the three radar systems 10A, 10B, 10C is furthermore configured so as to identify, from among the detected elements, those that are static, that is to say stationary with respect to the traffic lane 2 in which the vehicle 1 is traveling. The radar system 10A, 10B, 10C is configured so as then to deliver, to the processing unit 3, a data record of data representative of the positions $O_{j,n}$, at time $t_n$, with respect to the vehicle 1, of the various elements in the surroundings E that are identified as being static.

With regard now to the inertial measurement unit 4, this comprises at least a gyrometer and an accelerometer, and delivers data representative:
of the yaw rate $\omega$ of the vehicle 1, that is to say of its rotational speed, with respect to the traffic lane 2, about an axis z1 perpendicular to the floor of the vehicle,
of the longitudinal acceleration $a_x$ of the vehicle 1, that is to say of the component of its acceleration vector along the longitudinal axis x1, and
of the lateral acceleration $a_y$ of the vehicle 1, that is to say of the component of its acceleration vector along the transverse axis y1.

Each rotational speed sensor 5A, 5B, 5C, 5D is configured so as to acquire a rotational speed of the wheel 6A, 6B, 6C, 6D with which it is associated. This rotational speed may be acquired for example by way of a magnetic field sensor, joined to the chassis of the vehicle, and that detects the successive passages of teeth of a toothed wheel made of magnetic material, joined to the axle of the wheel 6A, 6B, 6C, 6D under consideration. The rotational speed of the wheel 6A, 6B, 6C, 6D, acquired by the corresponding rotation sensor, is then multiplied by a nominal radius of the wheel in order to obtain a speed of movement $v_{fl}$, $v_{fr}$, $v_{rl}$, $v_{rr}$ of this wheel with respect to the traffic lane 2 (speed which is expressed for example in kilometers per hour). The value of the nominal radius of the wheel is recorded in a memory of the vehicle, for example in a memory of the rotational speed sensor 5A, 5B, 5C, 5D or in a memory of the electronic processing unit 3. The multiplication operation in question may be performed either directly by the rotational speed sensor or by the processing unit 3.

The 4 rotational speed sensors 5A, 5B, 5C and 5D thus make it possible to determine:
- the speed of movement $v_{fl}$ of the front left wheel 6A,
- the speed of movement $v_{fr}$ of the front right wheel 6B,
- the speed of movement $v_{rl}$ of the rear left wheel 6C, and
- the speed of movement $v_{rr}$ of the rear right wheel 6D.

The speeds of movement of these various wheels depend directly on the speed of movement of the vehicle 1 and, in the case of a bend, on the steering angle of the wheels. As explained in detail further below, they contribute to determining the speed of movement of the vehicle 1 as performed by the processing unit 3.

In practice, this is an approximation of the speeds of movement of the wheels, in that the nominal radius of the wheel recorded in the memory of the vehicle corresponds exactly to the radius of the wheel only rarely.

With regard to the steering angle sensor 7, this may for example be formed by way of an angular position sensor mounted on the steering column of the vehicle. This delivers an item of data representative of the steering angle δ of the steered wheels of the vehicle 1, or at the very least an item of data allowing the processing unit 3 to determine this steering angle δ. The steering angle δ is the angle formed between the longitudinal axis x1 of the vehicle and the plane of rotation of one or the other of the steered wheels, which correspond here to the front left wheel 6A and to the front right wheel 6B of the vehicle.

The processing unit 3 comprises communication means for receiving the data delivered by the various sensors 4, 5A, 5B, 5C, 5D, 7, 10A, 10B and 10C described above. It also comprises one or more electronic memories and one or more processors. It is programmed to execute the method described below.

Method for Determining the Displacement Vector of the Vehicle, and its Speed of Movement In this method, the processing unit 3 determines a displacement vector of the vehicle, from positions of elements in the surroundings that are detected at two successive times by the radar systems 10A, 10B and 10C of the vehicle (steps a) to c) in FIG. 2).

It then deduces therefrom a first estimate $v_{1A}$, $v_{1B}$, $v_{1C}$ of the speed of the vehicle (step d)).

Moreover, the speeds of movement of the wheels $v_{fl}$, $v_{fr}$, $v_{rl}$ and $v_{rr}$, which are the same in number as second estimates of the speed of the vehicle 1, are determined in a step e) on the basis of the rotational speeds acquired by the rotational speed sensors 5A, 5B, 5C and 5D.

The processing unit 3 then fuses the first estimates of the speed of the vehicle, $v_{1A}$, $v_{1B}$ and $v_{1C}$ with the speeds of movement of the wheels $v_{fl}$, $v_{fr}$, $v_{rl}$ and $v_{rr}$, in order to accurately determine the speed of movement of the vehicle 1, as well as the position of the vehicle in its surroundings. This fusion is performed using a specific Kalman filter, in a step f).

The way in which the first estimate $v_{1A}$, $v_{1B}$, $v_{1C}$ of the speed of the vehicle 1 is determined from the data delivered by the corresponding radar system is the same here for each of the three radar systems 10A, 10B and 10C. This determination technique will therefore be described in detail only once, in the case of the first radar system 10A.

Steps a) to d), in which the processing unit 3 determines the displacement vector of the vehicle 1, and the first estimate $v_{1A}$ of its speed, will be described first of all.

The fusion step f), in which the processing unit 3 more precisely determines the value of the speed v of the vehicle 1, will then be described.

Determination of the Displacement Vector of the Vehicle and First Estimate of its Speed In this method, the radar system 10A executes acquisition step a) several times in succession, at several successive times $t_{n-1}$, $t_n$, $t_{n+1}$, etc. (step a) has been described above in the presentation of this radar system). This makes it possible to determine the way in which the elements in the surroundings E move with respect to the vehicle 1, and therefore, conversely, to deduce therefrom the way in which the vehicle moves with respect to these fixed elements in the surroundings E. In the case of the radar model mentioned above, the duration between two successive executions of step a) is approximately 70 milliseconds.

FIG. 3 shows, by way of example, the positions of static elements, detected at two successive times $t_n$ and $t_{n+1}$ by the first radar system 10A of the vehicle (front radar). These two sets of positions were determined in a situation in which the vehicle 1 is moving forward, at approximately 100 kilometers per hour.

The positions $O_{1,n}, \ldots, O_{j,n}, O_{M,n}$ of the static elements detected at the previous time $t_n$ are identified in this figure by crosses in the form of a "plus" sign (+). The positions $O_{1,n+1}, \ldots, O_{i,n+1}, O_{N,n+1}$ of the static elements detected at the following time $t_{n+1}$ are for their part identified by crosses in the form of a "multiplication" sign (×).

These various positions are identified in a reference system {x1, y1} linked to the vehicle 1. This reference system is formed by the longitudinal axis x1 of the vehicle, which extends from the back to the front of the vehicle, and by a transverse axis y1, perpendicular to the longitudinal axis x1 and that extends here from the right to the left of the vehicle. The longitudinal axis x1 and the transverse axis y1 are both parallel to the floor of the vehicle.

It may be seen in FIG. 3 that, between the previous time $t_n$ and the following time $t_{n+1}$, the detected elements have moved closer to the vehicle, thus reflecting the forward movement of the vehicle 1 between these two times. It is precisely by making use of this shift that the displacement vector of the vehicle is determined (this vector is representative of the displacement of the vehicle between the previous time $t_n$ and the following time $t_{n+1}$).

This displacement vector is determined in two stages.

First of all, in step b), the processing unit 3 associates the previous positions $O_{1,n}, \ldots, O_{j,n}, O_{M,n}$ with the following positions $O_{1,n+1}, \ldots, O_{i,n+1}, O_{N,n+1}$, in order to form various pairs of positions each grouping together the previous position and the following position of the same element in the surroundings E of the vehicle 1.

Second of all, in step c), the processing unit 3 determines the displacement vector of the vehicle, by linear regression, from the previous and following positions of the pairs of positions formed in step b).

Steps b), c) and d) in question are now described in more detail.

Step b): Association

Each pair of positions formed in step b) comprises:
the previous position $O_{j,n}$ of one of the elements in the surroundings E detected at the previous time $t_n$, and
one of the following positions $O_{1,n+1}, \ldots, O_{i,n+1}, \ldots, O_{N,n+1}$, identified as corresponding to the position of this same element, at the following time $t_{n+1}$.

Among the various feasible pairs of positions $\{O_{j,n}, O_{i,n+1}\}$, which each group together one of the following positions $O_{i,n+1}$ and one of the previous positions $O_{j,n}$, the pairs that are ultimately formed in step b) are those that are most consistent with a previous estimate of the speed v of the vehicle and with a previous estimate of its yaw rate ω.

In order to identify these pairs of successive positions, provision is made here:
b1) for the various feasible pairs of positions, to determine an individual cost $D_{ij}$, associated with the feasible pair of positions $\{O_{j,n}, O_{i,n+1}\}$ under consideration, on the basis of the previous position $O_{j,n}$ and of the following position of this feasible pair of positions, and
b2) from among various sets of feasible pairs of positions, to identify the set of feasible pairs of positions for which the value of an overall cost function F is smallest, this overall cost function F being determined on the basis of the individual costs $D_{ij}$ associated respectively with the various pairs of positions of the set under consideration.

The individual cost $D_{ij}$ is furthermore determined on the basis of the previous estimate of the speed v of the vehicle and, here, on the basis of the previous estimate of its yaw rate ω.

The pairs of positions ultimately formed in step b) are the pairs of positions of the set identified by minimization in step b2).

In step b1), for each feasible pair of positions $\{O_{j,n}, O_{i,n+1}\}$, before calculating the individual cost $D_{ij}$ associated with this pair of positions, the processing unit 3 determines whether it is possible, or on the contrary unlikely, that this pair of positions groups together two successive positions of the same element in the surroundings E of the vehicle 1.

Here, the processing unit 3 determines that it is unlikely that the pair of positions $\{O_{j,n}, O_{i,n+1}\}$ groups together two successive positions of the same element in the surroundings E of the vehicle 1 when one of the conditions described below is met. On the contrary, when none of these conditions is met, the processing unit 3 determines that it is possible that the pair of positions $\{O_{j,n}, O_{i,n+1}\}$ groups together two successive positions of the same element in the surroundings E of the vehicle 1.

Condition 1: a direction of movement of the vehicle, deduced from the pair of positions $\{O_{j,n}, O_{i,n+1}\}$ under consideration, is opposite a direction of movement of the vehicle determined at the previous time.

Condition 2: a lateral deviation, parallel to the transverse axis y1 of the vehicle, between the two positions $O_{i,n+1}$ and $O_{j,n}$ of the pair under consideration, is greater than a maximum feasible lateral deviation when it has been previously determined that the vehicle is moving essentially in a straight line. By way of example, the maximum feasible lateral deviation may be equal to approximately 1 meter when the previous time $t_n$ and the following time $t_{n+1}$ are, as in this case, separated by approximately 0.07 seconds.

Condition 3: a deviation $d(O_{i,n+1}, O_{j,n})$ between the following position $O_{i,n+1}$ of the pair under consideration and an extrapolated position $O'_{j,n}$, deduced from the previous position $O_{j,n}$ of this pair, is greater than a maximum feasible deviation $d_{max}$.

The extrapolated position $O'_{j,n}$ in question is determined by shifting the previous position $O_{j,n}$ of the pair under consideration, on the basis of:
a previous estimate of the speed v of the vehicle and a previous estimate of its yaw rate ω (the previous estimates in question having for example been determined in a previous execution of step f), described further on), and
the duration $\Delta t = t_{n+1} - t_n$ between the previous time $t_n$ and the following time $t_{n+1}$.

The extrapolated position $O'_{j,n}$ is the position that the element in the previous position $O_{j,n}$ would occupy at the following time $t_{n+1}$ if the vehicle were to continue moving at the speed v, and with the yaw rate ω, between the previous times and the following times. By way of example, if the previous estimate of the yaw rate is zero, the extrapolated position $O'_{j,n}$ is determined by shifting the previous position $O_{j,n}$ toward the vehicle, parallel to the longitudinal axis x1, by an amount equal to the product of the duration $\Delta t$ and the previous estimate of the speed v of the vehicle 1.

In the embodiment described here, the deviation $d(O_{i,n+1}, O_{j,n})$ is a quadratic deviation, equal to the square of the distance between:
the following position $O_{i,n+1}$ of the pair under consideration, and
the extrapolated position $O'_{j,n}$ determined for this pair.

With regard to the maximum feasible deviation $d_{max}$, its value is for example equal to the square of the product of the abovementioned duration $\Delta t$ and a speed threshold $v_s$. The speed threshold $v_s$ may for example be between 3 and 20 meters per second.

With regard now to the value of the individual cost $D_{ij}$, when the processing unit 3 has determined that it is unlikely that the pair of positions $\{O_{j,n}, O_{i,n+1}\}$ groups together two successive positions of the same element in the surroundings E of the vehicle 1, it then assigns a predetermined threshold value, equal for example to the abovementioned maximum feasible deviation $d_{max}$, to the individual cost $D_{ij}$.

On the contrary, when the processing unit 3 has determined that it is possible that the pair of positions $\{O_{j,n}, O_{i,n+1}\}$ groups together two successive positions of the same element in the surroundings E of the vehicle 1, then it assigns the value of the abovementioned deviation $d(O_{i,n+1}, O_{j,n})$ to the individual cost $D_{ij}$: $D_{ij} = d(O_{i,n+1}, O_{j,n})$.

Here, in step b1), the processing unit determines as many individual costs $D_{ij}$ as there are separate feasible pairs of positions, each grouping together one of the previous positions $O_{1,n}, \ldots, O_{j,n}, \ldots, O_{M,n}$ and one of the following positions $O_{1,n+1}, \ldots, O_{i,n+1}, \ldots, O_{N,n+1}$. The processing unit therefore determines a number N×M of individual costs, where M is the number of previous positions $O_{1,n}, \ldots, O_{j,n}, \ldots, O_{M,n}$ determined in the previous execution of step a), and where N is the number of following positions $O_{1,n+1}, \ldots, O_{i,n+1}, \ldots, O_{N,n+1}$, determined when step a) is executed again. These various individual costs may for example be grouped together in the form of a cost matrix with N rows and M columns, of which the coefficient of indices i and j (coefficient of row number i and column number j) is the individual cost $D_{ij}$ associated with the pair comprising the following position $O_{i,n+1}$ and the previous position $O_{j,n}$.

Next, in step b2), the processing unit 3 identifies, from among various sets of feasible pairs of positions, the one for which the value of the overall cost function F is smallest.

In this case, the cost function F is equal, for each of these sets of pairs, to the sum of the individual costs $D_{ij}$ associated with the various feasible pairs of positions of the set under consideration.

Each of these sets of feasible pairs of positions corresponds to one way of associating, in pairs, the previous positions $O_{1,n}, \ldots, O_{j,n}, \ldots, O_{M,n}$ with the following positions $O_{1,n+1}, \ldots, O_{i,n+1}, \ldots, O_{N,n+1}$, each previous position being associated with at most one of the following positions.

Each set of feasible pairs of positions may for example be represented by an association matrix with N rows and M columns. The coefficient $A_{ij}$ of this association matrix may then be set to 1 if, for this set of pairs, the previous position $O_{j,n}$ (of index j) is associated with the following position $O_{i,n+1}$ (of index i), the coefficient $A_{ij}$ otherwise being zero. The cost function F may then be expressed in accordance with the following formula F1:

$$F = \Sigma_{i=1}^{N} \Sigma_{j=1}^{M} D_{ij} A_{ij} \tag{F1}$$

Among these various sets of feasible pairs of positions, the processing unit 3 identifies the one for which the cost function F is minimum by way for example of the Kuhn-Munkres algorithm (also known as the Hungarian algorithm). This algorithm specifically makes it possible to find the set of pairs (sometimes called "coupling" in the literature) that minimizes the sum of individual costs associated with the various feasible pairs. In the specialist literature, when the algorithm is described based on a graph-based representation, these pairs are sometimes designated as "edges" that link the two elements of the pair under consideration (in this case, the two elements linked by one of these "edges" are therefore the previous position and the following position of the pair of positions in question). With regard to the individual cost of each pair (which is calculated here in a particularly original way), this is sometimes called the "weight" of the edge in the specialist literature.

In step b) that has just been described, associating the previous positions with the following positions with the criterion of the deviation between the following positions and extrapolated positions leads to a much more accurate and robust association than if this association were based on a deviation between following positions and previous positions. The association that is obtained is in particular more reliable than the one usually used in what is called the "ICP" method mentioned above, where each previous position is simply associated with the one of the following positions that is closest thereto, without taking into account a previous estimate of a speed of movement or of a displacement vector.

Moreover, determining whether it is possible, or on the contrary unlikely, that a given pair of positions groups together two successive positions of the same element in the surroundings of the vehicle, before calculating the individual cost $D_{ij}$ associated with this pair, makes it possible to reduce the computing time necessary to execute association step b). Specifically, by virtue of this provision, when condition 1 or condition 2 is met, this clearly indicating that the pair under consideration does not group together two successive positions of the same element, this avoids unnecessarily calculating the deviation d between the following position and the extrapolated position of this pair.

Moreover, limiting the value of the individual cost $D_{ij}$ to the threshold value $d_{max}$, for the pairs of positions that are unlikely to group together two successive positions of the same element, makes it possible to prevent these pairs of positions from having a predominant influence in the cost function F (due to the high value of the deviation d for these pairs). This makes it possible to associate the following positions with the previous positions according to the best overall consensus, even if this means that the set of pairs of positions thus formed contains a few "untenable" pairs of positions. These untenable pairs of positions will then be discarded in linear regression step c).

For the example of following and previous positions that may be seen in FIG. 3, the pairs of positions formed in step b) have been shown in the form of lines, each linking one of the previous positions $O_{j,n}$ to the following position $O_{i,n+1}$ with which it is associated.

For this example, it may be seen that some following or previous positions are not associated in a pair at the end of step b). The non-associated positions may for example be positions of elements in the surroundings that are detected at the following time, but not at the previous time, as is the case for the position surrounded by a circle in FIG. 3. More generally, the non-associated positions correspond to positions for which no nearby position compatible with the previous estimate of the speed of the vehicle and of its yaw rate was found.

Step c): Linear Regression

The movement of the vehicle 1, between the previous time $t_n$ and the following time $t_{n+1}$, corresponds to what is called a "solid body" movement, and is therefore broken down into:
- a translational movement, characterized by the displacement vector $T=(t_x, t_y)^T$ (the quantities $t_x$ and $t_y$ are the components of the displacement vector T in the reference system {x1, y1} linked to the vehicle), and
- a rotation about the axis z1, by an angle of rotation θ, corresponding to the variation in the heading angle of the vehicle between the previous time $t_n$ and the following time $t_{n+1}$.

In step c), the processing unit 3 determines the displacement vector T and the angle of rotation θ by determining, by linear regression, the "solid body" movement, that is to say the overall translation and the overall rotation, which, for the pairs of positions formed in step b), makes it possible to match said previous positions ($O_{j,n}$) with said following positions ($O_{i,n+1}$), that is to say which makes it possible to substantially transform the following positions $O_{i,n+1}$ into the previous positions $O_{j,n}$, or vice versa.

In this case, the features of this overall translation and of this overall rotation are determined more accurately so as to minimize, for at least some of the pairs of positions formed in step b), an average $e_m$ of a deviation e between:
- the previous position $O_{j,n}$ of the pair of positions under consideration, and
- a transformed position, obtained by applying said translation and the overall rotation to the following position $O_{i,n+1}$ of this pair.

The processing unit 3 then determines that the displacement vector T of the vehicle 1 is equal to the translation vector characterizing this overall translation, and that its angle of rotation θ is equal to the angle of the overall rotation determined by linear regression (this rotation is also a rotation about the axis z1).

As already indicated, the pairs of positions formed in step b) may include a few untenable pairs of positions, for which the following position of the pair is able to be transformed into its previous position only by a transformation that is highly different from the translation and from the overall rotation mentioned above.

To prevent these untenable pairs of positions from influencing the displacement vector T and the angle of rotation θ that are determined in step c), the features of the rotation and of the overall translation are identified by an iterative linear regression procedure of "RANSAC" type (according to the acronym "RANdom SAmple Consensus").

The processing unit 3 is thus programmed, in step c), to execute the set of steps c1) to c5) described below several times in succession.

In step c1), at least three pairs of positions are selected randomly from among the pairs of positions formed in step b).

In following step c2), the processing unit 3 determines a first overall translation and a first overall rotation, by linear regression, from the previous and following positions of the pairs of positions selected in step c1). This first translation and this first rotation are determined so as to transform the following positions of these pairs into positions that are, on average, as close as possible to their previous positions.

In step c3), for each pair of positions, formed in step b) and that was not selected in step c1), provision is made:
- to transform the following position $O_{i,n+1}$ of this pair into a first transformed position $O^{f1}_{i,n+1}$ by applying the first translation and the first overall rotation determined in step c2) to the following position in question, and
- to determine a residual associated with this pair, equal here to a deviation e1 (for example a quadratic deviation) between the previous position of the pair under consideration and the first transformed position $O^{f1}_{i,n+1}$.

In step c4), the processing unit 3 selects a subset of pairs of positions comprising:
- the pairs of positions selected in step c1), and
- the pairs of positions, formed in step b), that were not selected in step c1), and for which said residual is less than a given limit (this limit being for example equal to the abovementioned maximum feasible deviation $d_{max}$).

The processing unit then determines a second overall translation and a second overall rotation, by linear regression, on the basis of the previous positions and the following positions of the pairs of this subset. Again, the second translation and rotation are determined so as to transform the following positions of the pairs under consideration into positions that are, on average, as close as possible to their previous positions.

Next, in step c5), the processing unit 3 determines an accuracy with which the second translation and the second rotation transform:
- the previous positions of the pairs of the subset of pairs selected in step c4), into
- all of the following positions of these pairs.

For this purpose, the processing unit may for example calculate the average value $e_m$, on this subset of pairs, from the deviation e between:
- the previous position $O_{j,n}$ of the pair of positions under consideration, and
- a second transformed position $O^{f2}_{j,n}$, obtained by applying the second translation and the second overall rotation determined in step c4) to the following position $O_{i,n+1}$ of this pair.

After having executed the set of steps c1) to c5) several times, the processing unit 3 selects, from among the second overall translations and rotations that have been determined, those for which said accuracy is best, that is to say for example those for which the average value $e_m$ of the deviation e is smallest.

The features of the overall translation and of the overall rotation ultimately selected in step c) are those of the second translation and of the second rotation thus selected by the processing unit 3.

The detail of the linear regression operation in itself, executed in step c2) and c4), is not strictly speaking part of the invention, and therefore has not been described in detail here. This operation may for example be performed in accordance with the method described in the following article: "Least-squares fitting of two 3-d point sets", S. Arun, T. S. Huang, and S. D. Blostein, IEEE Transactions on pattern analysis and machine intelligence, no. 5, pp. 698-700, 1987.

Step d)

In step d), the processing unit 3 determines the first estimate $v_{1A}$ of the speed of the vehicle 1, as well as a first estimate $\omega_{1A}$ of its yaw rate, on the basis of the displacement vector T and of the angle of rotation θ that are determined in step c).

The speed v of the vehicle 1 here denotes the algebraic speed of the vehicle with respect to the traffic lane 2. In other words, this is the norm of its speed vector, assigned the plus sign if the vehicle is moving forward, and the minus sign if not.

Therefore, in step d), the first estimate $v_{1A}$ of the speed of the vehicle 1 is determined by calculating the norm of the displacement vector T, assigned the sign of the component $t_x$ of this vector, and by dividing everything by the duration Δt between the following and previous times:

$$v_{1A} = \text{sign}(t_x)\sqrt{t_x^2 + t_y^2}/\Delta t \tag{F2}$$

The first estimate $\omega_{1A}$ of its yaw rate is for its part determined by dividing the angle of rotation θ by the duration Δt.

Moreover, in step d), the processing unit 3 determines an uncertainty $\sigma_v$, associated with the first estimate $v_{1A}$ of the speed of the vehicle. This uncertainty is representative of the accuracy with which the "solid body" transformation, identified in step c), transforms the previous positions of the detected elements into their following positions. This uncertainty $\sigma_v$ is determined for example on the basis of the average value $e_m$ of the deviation e between transformed positions and previous positions.

The set of steps a) to d) that have just been described is executed several times in succession, at various time increments $t_n$, $t_{n+1}$, $t_{n+2}$, etc.

Thus, each time step a) is executed again, steps b), c) and then d) are also executed again in order to determine the values, at the time $t_{n+1}$ under consideration, of the first estimates $v_{1A}$ and $\omega_{1A}$ of the speed of the vehicle 1 and of its yaw rate.

On the other hand, as already indicated, the processing of the data from the second and third radar systems 10B and 10C is comparable to that described above in the case of the first radar system 10A. Thus, during this method, the processing unit 3 also determines, at several successive times, the values of the first estimates $v_{1B}$ and $v_{1C}$ of the speed of the vehicle 1, as well as those of first estimates $\omega_{1B}$ and $\omega_{1C}$ of its yaw rate.

Determination of the Speed and the Position of the Vehicle by Fusing Radar Data and Odometer Data As already indicated, the data fusion carried out in step f) is performed by way of a specific Kalman filter.

Step f) therefore comprises a propagation step f1) (also called prediction step), and an updating step f2) (also called calibration step, or observation step), which are executed several times in succession and iteratively.

During step f1), a new estimate $[x]_{k+1}$ of a state vector $[x]$ of the vehicle 1 is determined, on the basis of a previous estimate $[x]_{k,c}$ of this state vector and of a "propagation" model that models the movement dynamics of the vehicle. In this case, the previous estimate of the state vector, $[x]_{k,c}$, is a corrected estimate determined in a previous execution of update step f2).

During step f2), the estimate of the state vector $[x]_{k+1}$ that was determined in step f1) is calibrated on the basis of various "measurements" relating to the state of the vehicle in order to obtain a new corrected estimate of the state vector of the vehicle, $[x]_{k+1,c}$.

These measurements (sometimes called "observations") come from the sensors that were presented above, 4, 5A, 5B, 5C, 5D, 7, 10A, 10B and 10C. They include here:
- the first estimates $v_{1A}$, $v_{1B}$, $v_{1C}$ of the speed of the vehicle 1, determined from the data acquired by the radar systems 10A, 10B, 10C, as well as the first estimates $\omega_{1A}$, $\omega_{1B}$ and $\omega_{1C}$ of the yaw rate of the vehicle,
- the speeds of movement of the wheels $v_{fl}$, $v_{fr}$, $v_{rl}$ and $v_{rr}$, determined from the data acquired by the rotational speed sensors 5A, 5B, 5C, 5D,
- a measurement of the steering angle, $\delta^m$, determined by way of the steering angle sensor 7,
- a measurement of the yaw rate, $\omega^m$, and a measurement of the longitudinal acceleration of the vehicle, $a^m_x$, delivered by the inertial measurement unit 4.

With regard to the state vector $[x]$ of the vehicle, this comprises the following components here:
- an X coordinate and a Y coordinate indicating the position of the vehicle 1 in a reference system {x,y} that is fixed with respect to the surroundings E of the vehicle (fixed with respect to the traffic lane 2),
- a heading angle $\alpha$, formed here between the longitudinal axis x1 of the vehicle and the x axis of the fixed reference system {x,y},
- the speed v of the vehicle 1 with respect to the traffic lane 2,
- an acceleration a of the vehicle 1 (norm of its acceleration vector, assigned a sign),
- the steering angle $\delta$,
- a scale factor f, representative of a deviation between the nominal radius of the wheels 6A, 6B, 6C, 6D and an effective, average radius of these wheels, and
- a bias b affecting the yaw rate $\omega$ measurements performed by the inertial processing unit 4.

Including the scale factor f in the state vector of the vehicle and estimating its value makes it possible, when comparing the estimate of the speed $v_k$ with one of the speeds of movement of the wheels $v_{fl}$, $v_{fr}$, $v_{rl}$, $v_{rr}$, to take into account any variations in the effective radius of the wheels. These variations may be due for example to a variation in the pressure in the tires of the wheels, or to a variation in their temperature. It is beneficial to take these variations into account because, in the event of a deviation between the radius of one of the wheels and the pre-recorded nominal radius, the speed of movement of the wheel, delivered by the corresponding rotational speed sensor, is marred by a systematic error that is greater when the speed of the vehicle is greater. In practice, the effective radius of the wheels (which corresponds to the average radius that the wheels of the vehicle actually have at the time under consideration) may often deviate from their nominal radius by a few percent, and it is therefore desirable to take this into account.

The propagation model used here in step f1) is what is called a "constant steering angle and acceleration" model (or CSAA in acronym form). In this model, it is assumed that, between two successive time increments, the acceleration a and the steering angle $\delta$ are constant. Moreover, in this model, the yaw rate $\omega$ is equal to the following quantity:

$$\omega = v \cdot \tan(\delta)/L \quad (F3)$$

where L is the wheelbase of the vehicle, that is to say the distance between its front axle and its rear axle.

In step f1), in order to determine the new estimate of the state vector $[x]_{k+1}$, it is therefore assumed that the state vector $[x]$ has evolved, since the determination of the previous corrected estimate $[x]_{k,c}$, in accordance with the following formula F4:

$$[\dot{x}] = \begin{bmatrix} \dot{X} \\ \dot{Y} \\ \dot{\alpha} \\ \dot{v} \\ \dot{a} \\ \dot{\delta} \\ \dot{f} \\ \dot{b} \end{bmatrix} = \begin{bmatrix} v \cdot \cos(\alpha) \\ v \cdot \sin(\alpha) \\ v \cdot \tan(\delta)/L \\ a \\ 0 \\ 0 \\ 0 \\ 0 \end{bmatrix}. \quad (F4)$$

The various sensors of the vehicle operate asynchronously here. The various measurements mentioned above are thus generally determined at different times, and are not all available at the same time.

Step f2) is therefore executed here, after each execution of step f1), as soon as one of these measurements is available, by calibrating the estimate of the state vector on the basis of this measurement.

Thus, by way of example, in a situation where the sensors would first deliver the measurements $\omega^m$ and $a^m_x$ of the yaw rate and of the longitudinal acceleration, and then, subsequently, the speeds of movement of the wheels $v_{fl}$, $v_{fr}$, $v_{rl}$, $v_{rr}$, the sequence of execution of steps f1) and f2) would be as follows:
- execute step f2) in order to calibrate the estimate of the state vector $[x]$, on the basis of the measurements $\omega^m$ and $a^m_x$ (as soon as these measurements are available), and then
- execute propagation step f1), and then
- execute step f2) again, but calibrating the estimate of the state vector $[x]$ on the basis of the speeds of movement of the wheels $v_{fl}$, $v_{fr}$, $v_{rl}$ and $v_{rr}$, and then
- execute propagation step f1) again, and so on.

What is noteworthy is that, in step f2), the first estimates $v_{1A}$, $v_{1B}$, $v_{1C}$ of the speed of the vehicle 1, which may exhibit fluctuations but which turn out to be unbiased, are used to calibrate the estimate of the scale factor $f_k$, in order to take into account any deviation between the effective radius of the wheels and their nominal radius.

In order to perform this calibration, each time one of the first estimates $v_{1A}$, $v_{1B}$, $v_{1C}$ of the speed of the vehicle 1 has been determined, a measurement of the scale factor is deduced therefrom. Thus, for example, when a new value of the first estimate $v_{1A}$ is available, a new value of the measurement of the scale factor, $f^m$, is determined in accordance with the following formula:

$$f^m = 1 - \frac{v_{1A}}{v_k(1-f_k)} + \sigma_f \quad (F5)$$

where $\sigma_f$ is a deviation, dependent on the uncertainty $\sigma_v$ associated with the first estimate $v_{1A}$ of the speed of the vehicle.

This new value of the measurement of the scale factor $f'''$ is then used to calibrate the previous estimate of the scale factor, $f_k$, using the usual technique for a Kalman filter, that is to say by determining a correction gain (sometimes called Kalman gain), and then by calculating the corrected estimate $f_{k+1,c}$ by adding, to the previous estimate $f_k$, a corrective term equal to the Kalman gain multiplied by the difference between the measurement of the scale factor $f'''$ and the previous estimate $f_k$.

On the other hand, when the estimate of the speed $v_k$ is calibrated on the basis of one of the speeds of movement of the wheels $v_{fl}$, $v_{fr}$, $v_{rl}$, $v_{rr}$, account is taken, through the scale factor f, of the fact that the effective radius of the wheels is not necessarily exactly equal to their pre-recorded nominal radius.

For this purpose, in the observation model used in step f2), it is assumed that the speed of movement of the front left wheel $v_{fl}$ is a measurement of the following quantity:

$$v_k\left(1 - \frac{I_f}{2}\frac{\tan(\delta_k)}{L}\right)\frac{1}{\cos(\delta_k)} + f_k \cdot v_k \quad (F6)$$

where $I_f$ is the distance between the two front wheels 6A and 6B.

The previous estimate of the speed of the vehicle, $v_k$, is thus as it were compensated beforehand, on the basis of the scale factor f, before being compared with the measurement $v_{fl}$, so as to take into account the systematic error affecting this measurement.

In a comparable way, in this Kalman filter, the speed of movement of the front right wheel $v_{fr}$ is used as a measurement of the following quantity:

$$v_k\left(1 + \frac{I_f}{2}\frac{\tan(\delta_k)}{L}\right)\frac{1}{\cos(\delta_k)} + f_k \cdot v_k. \quad (F7)$$

The speed of movement of the rear left wheel $v_{rl}$ is for its part used as a measurement of the following quantity:

$$v_k\left(1 - \frac{I_r}{2}\frac{\tan(\delta_k)}{L}\right) + f_k \cdot v_k \quad (F8)$$

where $I_r$ is the distance between the two rear wheels 6C and 6D.

And the speed of movement of the rear right wheel $v_{rr}$ is used as a measurement of the following quantity:

$$v_k\left(1 + \frac{I_r}{2}\frac{\tan(\delta_k)}{L}\right) + f_k \cdot v_k. \quad (F9)$$

Thus, each time a new value of the speed of movement of one of the wheels is determined, the processing unit calibrates the estimate of the state vector of the vehicle $[x]_{k+1}$ on the basis of the deviation between:
the measurement under consideration $v_{fl}$, $v_{fr}$, $v_{rl}$ or $v_{rr}$, and
the corresponding quantity mentioned above.

Finally, after each execution of step f2), the processing unit 3 delivers the corrected estimates $X_{k+1,c}$, $Y_{k+1,c}$ and $v_{k+1,c}$ of the position and of the speed of the vehicle, denoted more simply $X_c$, $Y_c$ and $v_c$ in the figures.

The specific Kalman filter used here to fuse the data from the radar systems with those from the rotational speed sensors makes it possible to very effectively correct the sources of errors affecting the measurements.

Specifically, rather than correcting the speeds of movement $v_{fl}$, $v_{fr}$, $v_{rl}$, $v_{rr}$ by comparing them directly with the first "radar" estimates $v_{1A}$, $v_{1B}$ and $v_{1C}$ (as if they were affected only by a constant bias), account is taken here, via the scale factor f, of the fact that these "odometer" speeds $v_{fl}$, $v_{fr}$, $v_{rl}$, $v_{rr}$ are marred by a variable error, which is greater when the speed of the vehicle is greater (since this error results from a variation in the average radius of the wheels). Calibrating the value of this scale factor f on the basis of the first "radar" estimates of the speed of movement, which estimates may exhibit fluctuations but turn out to be unbiased, then allows stable correction of the errors affecting the speeds of movement of the wheels $v_{fl}$, $v_{fr}$, $v_{rl}$, $v_{rr}$, even though these errors vary with the speed of the vehicle.

Example of Results

FIG. 4 schematically shows, for one example of a journey, the evolution over time t of the corrected estimate of the speed of the vehicle, $v_c$, determined using the method that has just been described. For this example of a journey, the vehicle 1 is moving substantially in a straight line, and its speed v is between 80 and 100 kilometers per hour.

For comparison, a reference speed of the vehicle, $v_{ref}$, is also shown in FIG. 4, for the same journey. This reference speed was measured using a particularly reliable reference sensor (in this case a model RT3000 sensor from the manufacturer OXTS), temporarily fitted to the vehicle during this trial. This reference speed $v_{ref}$ corresponds to the actual speed of the vehicle, v, with an accuracy better than 0.03 meters per second.

Moreover, a basic estimate of the speed of the vehicle, denoted $v_o$, is also shown in FIG. 4. This basic estimate was determined on the basis of the data delivered by the inertial measurement unit 4 and by the rotational speed sensors 5A, 5B, 5C, 5D, but without taking into account the data supplied by the radar systems 10A, 10B, 10C.

As may be seen in this figure, the corrected estimate of the speed of the vehicle $v_c$, obtained using the method described above, is very close to the actual value of the speed v of the vehicle. It is also observed that taking into account the data supplied by the radar systems 10A, 10B, 10C, as described above, makes it possible to significantly improve the accuracy with which the speed of the vehicle is determined, since the corrected estimate $v_c$ is significantly closer to the reference speed $v_{ref}$ than the basic estimate $v_o$.

Various variants may be applied to the method and to the vehicle that have been described above.

For example, the number of radar systems fitted to the vehicle could be different, and these radar systems could be positioned or oriented differently. The vehicle could also be equipped with a single radar system.

Moreover, in association step b), the individual cost associated with each pair of positions could be calculated using any function, increasing on the basis of the deviation d between the extrapolated position and the previous position of the pair under consideration, rather than being directly equal to this deviation d.

The invention claimed is:

1. A method for determining a displacement vector of a motor vehicle, comprising:
   a) determining, via a radar system fitted to the vehicle, positions, with respect to the vehicle, at a given time, of elements in surroundings of the vehicle that are static with respect to a traffic lane in which the vehicle is moving,
   wherein, with a) having been executed at a previous time in order to determine previous positions of said elements with respect to the vehicle, a) is executed again at a following time in order to determine following positions of said elements with respect to the vehicle;
   b) associating, via processing circuitry, said previous positions, determined via the radar system fitted to the vehicle, with said following positions, determined via the radar system fitted to the vehicle, to form various pairs of positions each grouping together the previous position and the following position of a same element in the surroundings of the vehicle; and
   c) determining, via the processing circuitry by linear regression, respective features of an overall translation and of an overall rotation that make it possible, for the pairs of positions formed in b), to match said previous positions with said following positions, and determining the displacement vector of the vehicle based on the features of said overall translation and rotation, wherein
   b) comprises: b1) for various feasible pairs of positions each grouping together one of the following positions and one of the previous positions, determining an individual cost, associated with the feasible pair of positions under consideration, based on the previous position and the following position of the feasible pair of positions.

2. The method as claimed in claim 1, wherein b) comprises:
   b2) from among various sets of feasible pairs of positions, identifying the set for which a value of an overall cost function is smallest, the overall cost function being determined based on the individual costs associated respectively with the various pairs of positions of the set under consideration,
   the pairs of positions ultimately formed in b) being the pairs of positions of the set thus identified in b2).

3. The method as claimed in claim 2, wherein b1) comprises for at least one of the feasible pairs of positions:
   shifting the previous position, based on an estimate of a speed of movement of the vehicle, and a duration between said previous and following times, in order to obtain an extrapolated position;
   determining a deviation between the following position and said extrapolated position, and
   determining the individual cost associated with the pair of positions, such that the individual cost is greater when said deviation is greater.

4. The method as claimed in claim 3, wherein, in b1), for at least some of the feasible pairs of positions:
   determining, prior to calculating the individual cost associated with the feasible pair of positions under consideration, whether it is possible or unlikely, that the pair groups together two successive positions of the same element in the surroundings of the vehicle, and
   when it has been determined that it is unlikely that the pair groups together two successive positions of the same element in the surroundings of the vehicle, said individual cost is assigned a predetermined threshold value.

5. The method as claimed in claim 4, wherein, in b1), it is determined that it is unlikely that the feasible pair of positions under consideration groups together two successive positions of the same element in the surroundings of the vehicle when one of the following conditions is met:
   said deviation is greater than a maximum feasible deviation,
   a direction of movement of the vehicle, deduced from the feasible pair of positions under consideration, is opposite a previously determined direction of movement of the vehicle, and
   a lateral deviation from a longitudinal axis of movement of the vehicle, deduced from the feasible pair of positions under consideration, is greater than a maximum feasible lateral deviation.

6. The method as claimed in claim 1, wherein c) comprises:
   c1) randomly selecting at least three pairs of positions from among the pairs of positions formed in b),
   c2) determining a first overall translation and a first overall rotation, by linear regression, from the pairs of positions selected in c1),
   c3) for each pair of positions, formed in b) and that was not selected in c1):
   transforming the following position into a transformed position by applying the first translation and the first overall rotation determined in c2) to the following position, and
   determining a residual, based on a distance between said transformed position and the previous position of the pair,
   c4) selecting a subset of pairs of positions comprising:
   the pairs of positions selected in c1), and
   the pairs of positions, formed in b), that were not selected in c1), and for which said residual is less than a given limit, and
   determining a second overall translation and a second overall rotation, by linear regression, based on the previous positions and the following positions of the pairs of the subset, and
   c5) evaluating an accuracy with which the second translation and the second rotation transform the following positions of the pairs of positions of the subset into the previous positions of the pairs,
   c1) to c5) being executed several times in succession,
   the features of the overall translation and of the overall rotation ultimately determined in c) being the features of the second translation and of the second rotation that make it possible to transform said following positions into said previous positions with the greatest accuracy.

7. A method for determining a speed of movement of a motor vehicle, wherein a displacement vector of the vehicle is determined in accordance with the method as claimed in claim 1, the method for determining the speed of the vehicle further comprising:
   d) determining a first estimate of the speed of the vehicle from the displacement vector of the vehicle determined in c),
   e) determining a second estimate of the speed of the vehicle based on a rotational speed of a wheel of the vehicle acquired by a rotational speed sensor, and
   f) determining the speed of the vehicle based on the first estimate of the speed and of the second estimate of the speed, by way of a Kalman filter configured so as to execute the following:

f1) determining a new estimate of a state vector of the vehicle, comprising components representative in particular of the speed and of an acceleration of the vehicle, f2) determining a corrected estimate of the state vector of the vehicle, by calibrating the estimate of the state vector determined in f1) based on the first estimate and the second estimate of the speed of the vehicle determined in d) and e), f1) and f2) being executed several times in succession and, when f1) is executed again, said new estimate of the state vector of the vehicle is determined based on the corrected estimate determined in the previous execution of f2).

8. The method as claimed in claim 7, wherein:

the second estimate of the speed of movement of the vehicle is further determined based on a nominal radius of said wheel, a value of which is pre-recorded in the vehicle, one of the components of the state vector of the vehicle estimated by the Kalman filter is a scale factor (f), representative of a deviation between said nominal radius and an effective radius of the wheels of the vehicle, and wherein in f2), the estimate of the speed of the vehicle that was determined in f1) is compared with the second estimate of the speed of the vehicle, taking the scale factor into account.

9. The method as claimed in claim 8, wherein, in f2), the estimate of the scale factor that was determined in previous f1) is calibrated based on a ratio between:

the first estimate of the speed of the vehicle, determined in d) from measurements from the radar system, and the estimate of the speed of the vehicle determined in previous f1).

10. A motor vehicle comprising:

a radar system configured to a) determine positions, with respect to the vehicle, at a given time, of elements in surroundings of the vehicle that are static with respect to a traffic lane in which the vehicle is moving, the radar system being configured, after having executed a) at a previous time in order to determine previous positions of said elements with respect to the vehicle, to execute a) again at a following time in order to determine following positions of the elements with respect to the vehicle; and processing circuitry configured to:

b) associate said previous positions, determined via the radar system, with said following positions, determined via the radar system, to form various pairs of positions each grouping together the previous position and the following position of the same element in the surroundings of the vehicle, and c) determine, by linear regression, features of an overall translation and of an overall rotation that make it possible, for the pairs of positions formed in b), to match said previous positions with said following positions, and determine a displacement vector of the vehicle based on the features of the translation and of the overall rotation, wherein in b), the processing circuitry is configured to b1) for various feasible pairs of positions each grouping together one of the following positions and one of the previous positions, determine an individual cost, associated with the feasible pair of positions under consideration, based on the previous position and the following position of the feasible pair of positions.

* * * * *